UNITED STATES PATENT OFFICE.

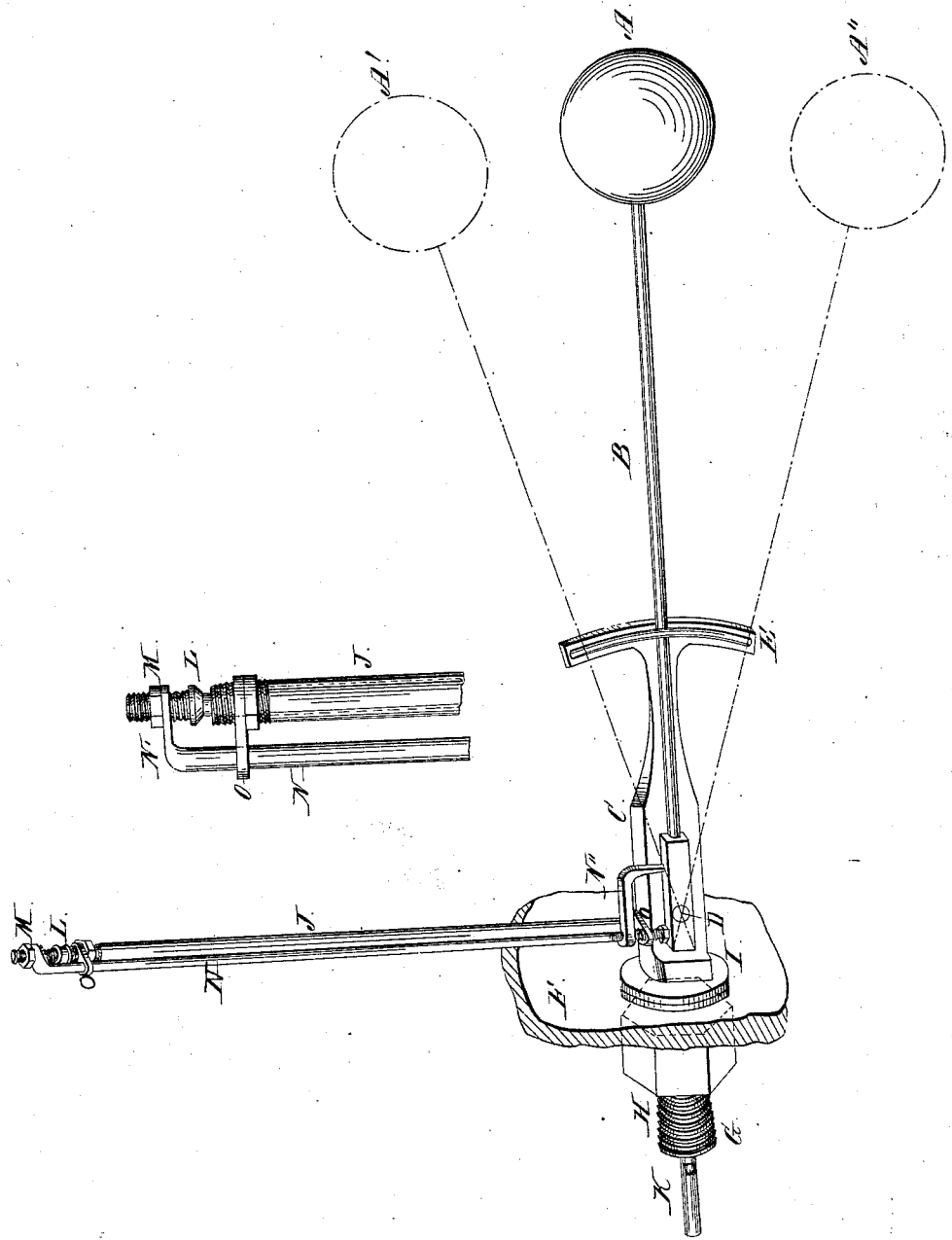
*Fournier & Hinman,*
*Steam-Boiler Indicator.*
Nº 18,425. Patented Oct. 13, 1857.

F. B. FOURNIER AND D. HINMAN, OF BEREA, OHIO, ASSIGNORS TO THEMSELVES AND I. MUNROE.

WATER-INDICATOR FOR STEAM-BOILERS.

Specification of Letters Patent No. 18,425, dated October 13, 1857.

*To all whom it may concern:*

Be it known that we, F. B. FOURNIER and D. HINMAN, of Berea, in the county of Cuyahoga and State of Ohio, have invented certain new and useful Improvements in Acoustic Indicators of High and Low Water in Steam-Boilers; and we do hereby declare the following to be a full and exact description of the same, reference being had to the accompanying drawings, in which—

Figure 1 is a representation of the indicator, and Fig. 2 a section of the same enlarged.

Like letters denote like parts, in the different views.

Our invention relates to the manner of indicating high or low water in steam boilers, by means of a float, to which is attached a lever, which operates a stem or rod, connected to a valve placed in a pipe or tube, which tube connects with a whistle on the outside of the boiler. By the raising and falling of the float, a valve is so operated that the steam passes through, and the signal is given by the whistle.

A, represents the float, attached to the arm or lever B, which is connected to the shank C, by a pivot or pin at D, upon which the lever B, works, as the float rises and falls. The lever plays between the guard E, and the shank to which the guard is attached. Seen in Fig. 1. This guard keeps the float from swaying about laterally, and at the same time allows it to rise and fall freely, in accordance with the state of the water in the boiler.

F, represents a section of a boiler, through which extends the outside end G of the stem which is provided with a nut and screw H. The flange or collar I, extends from the stem, and between this flange and the side of the boiler, is placed a gasket, or packing. Between the nut and the outside of the boiler may be placed another gasket. When thus arranged, the indicator is firmly attached to the boiler by the nut and screw H.

J represents a steam tube or pipe which screws into the stem on the inside of the boiler. This pipe communicates with a passage, or hole in the stem, extending to the whistle K, on the outside of the boiler. This whistle may be of any ornamental form desired, or a pipe may be connected to the outside end at G, so that steam may be conveyed to the whistle in any place at proper distance from the boiler.

In the upper end of the steam pipe J is placed the valve L, as seen in Fig. 2, the stem of which extends into the pipe, which stem is of such form as to allow the passage of steam through the pipe when the valve is opened. The upper end or stem of the valve is provided with a nut and screw M, which gages the opening, or distance, which the valve is to be raised by the rod N, which runs in the guides O, O', attached to the pipe. The upper end of the rod is turned at right angles, forming an arm, as seen at N', Fig. 2, through the end of which passes the upper stem of the valve, the arm N' being between the nut and valve as shown in Fig. 2. To the lower end of the rod is attached, by a screw or otherwise, the arm N''. By means of the screw the arm may be adjusted in the proper position for raising the valve.

In case of high water, the float A will rise to A', which raises the arm N'', and rod N, so that the valve is opened, or raised from L' to L, as seen in Fig. 2, which allows the steam to pass through the pipe, to the whistle, and thereby indicate too much water. In case of low water, the float drops to A''. The lever B then acts on the end of the rod N, and raises the valve in the manner as in high water, as before described, which gives a warning signal of low water.

The end of the rod N, and arm N'', rests upon the lever, on each side of the pin or fulcrum D, as seen in Fig. 1. The arm N' is allowed to play the distance between the nut at M, and the valve at L, without opening the valve. This will allow the variations in water that may occur with safety, without giving any signal, which would be done in high and low water, and when the signal is given it is easy to determine by the gage cocks whether it is for high or for low water.

The indicator is to be so placed in the boiler that the valve will be always above water. In this position, the valve is always free to act, as it is not liable to be obstructed by dirt, sediment, &c., which may be carried into the boiler with the water. The other parts are so arranged as not to be liable to obstruction by anything which might pass into the boiler, and as the parts are so simple in construction they will not be deranged by oxidation or sediment, as the float by its action between high and low water will keep the several parts moving so as to be always in working order.

The advantages to be derived from an indicator that will show low water, and thereby prevent the casualties that might occur from such a cause, are too well known to need enumeration.

It is known that an engine in working water when it is high becomes more or less strained and liable to be broken in some of its parts.

The signal of our indicator may be heard at a distance, or by a sleeping person on duty. Thus the attention of the engineer and fireman is necessarily directed to the state of the water in the boiler.

What we claim as our improvement and desire to secure by Letters Patent, is,

The rod N, and arms N', and N'', in combination with the pipe J, and valve L, when the same is arranged in relation to, and operated by, the lever B, so as to signal high or low water, by the whistle K, substantially as set forth.

F. B. FOURNIER.
DAVID HINMAN.

Witnesses:
C. D. EVERETT,
W. H. BURRIDGE.